United States Patent [19]

Dunkelberger

[11] 4,167,505
[45] Sep. 11, 1979

[54] IMPACT MODIFIED HIGH MELT FLOW POLYCARBONAMIDE

[75] Inventor: David L. Dunkelberger, Newtown, Pa.

[73] Assignee: Rohm and Haas Company, Philadelphia, Pa.

[21] Appl. No.: 868,780

[22] Filed: Jan. 12, 1978

[51] Int. Cl.$^2$ ............................................. C08L 77/00
[52] U.S. Cl. .............................. 260/37 N; 260/42.37; 260/42.47; 260/42.49; 260/42.53; 264/176 R; 525/66; 525/183; 525/902
[58] Field of Search ........ 260/857 TW, 857 G, 37 N, 260/42.37, 42.47, 42.49, 42.53

[56] References Cited

U.S. PATENT DOCUMENTS

| | | | |
|---|---|---|---|
| 3,216,965 | 11/1965 | Cipriani | 260/857 TW |
| 3,393,252 | 7/1968 | Zimmerman | 260/857 TW |
| 3,668,274 | 6/1972 | Owens et al. | 260/857 G |
| 3,796,771 | 3/1974 | Owens et al. | 260/857 G |

Primary Examiner—J. Ziegler
Attorney, Agent, or Firm—Jordan J. Driks; Lester E. Johnson; George W. Simmons

[57] ABSTRACT

Disclosed is a method for preparing an impact-resistant, high melt flow polycarbonamide comprising the steps of:
(a) preparing an impact modifier concentrate comprising a mixture of (i) 70–90 parts by weight of an acrylic impact modifier and (ii) 10–30 parts by weight of at least one high molecular weight aliphatic polycarbonamide; and
(b) mixing 10–30 parts by weight of the impact modifier concentrate from (a) above with 70–90 parts by weight of at least one low molecular weight aliphatic polycarbonamide.

The resulting polycarbonamide blends are characterized by high impact resistance and a melt flow which is essentially the same as that of the blend of the acrylic impact modifier and the low molecular weight nylon alone.

13 Claims, No Drawings

IMPACT MODIFIED HIGH MELT FLOW POLYCARBONAMIDE

BACKGROUND OF THE INVENTION

This invention relates to a method of preparing improved low molecular weight polycarbonamide compositions, articles prepared thereby, and to the modifier used therein. The polycarbonamides of the invention are characterized by improved impact resistance and high melt flow.

It is known that polymer modifiers can be used to improve properties of several plastic resins such as, for example, impact resistance and melt strength. U.S. Pat. Nos. 3,668,274; 3,796,771; and 3,784,497 to Owens and Clovis disclose the use of acrylic core//shell impact modifiers to impart improvement in the impact strength of higher molecularweight polycarbonamides (for example Nylons "66" and "6"), but the resulting blends do not exhibit the good flow which is necessary for injection molding operations. U.S. Pat. No. 3,963,799 to Stark-weather discloses ethylene-based rubbers as modifiers for low molecular weight easy-flow nylon, wherein caprolactam side chains are grafted onto the rubber by a specific and separate acid-amine coupling reaction. U.S. Pat. No. 3,920,602 to Freed discloses blends of nylon with a thermoplastic phenoxy resin in glass-filled systems. British Pat. No. 1,284,489 to Priddle et al. discloses ethylene-dimethylaminoethyl methacrylate copolymers as modifiers for nylon. German Pat. No. 2,356,899 to Chompff discloses cured nylon intermediates modified by butadiene-acrylic acid modifiers. U.S. Pat. No. 3,985,703 to Ferry et al. discloses a process for producing an acrylic core//shell polymer and thermoplastic polymers modified therewith. With the exception of Starkweather, the prior art is not directed to the problem of modifying low molecular weight, easy-flow nylon. Prior to the invention, core//shell polymers having high rubber core content were not capable of being admixed and dispersed in low molecular weight nylon due to the very low viscosity above the melting point and the resulting lack of shear.

It has been unexpectedly and surprisingly discovered that by obtaining an intimate dispersion of an acrylic core//shell modifier with a small amount of a higher molecular weight nylon and then blending this dispersion with a large excess of low molecular weight nylon, the impact modifier may be dispersed in the low viscosity nylon thereby yielding a final product characterized by improved impact resistance and high melt flow. By using a minimum amount of high molecular weight nylon, the melt flow of the final blend is essentially the same as that of the blend of the acrylic impact modifier and the low molecular weight nylon alone.

SUMMARY OF THE INVENTION

It is an object of this invention to provide a method for preparing an impact-resistant, high melt flow polycarbonamide suitable to be adapted to extrusion and molding processing.

Another object of this invention is to provide a composition of an impact-modified, high melt flow polycarbonamide.

Still another object of this invention is to provide an article of manufacture prepared by the method of the invention.

Still another object of this invention is to provide an impact modifier composition for low molecular weight polycarbonamides.

These objects and others, as will become apparent, are achieved by this invention which comprises a method of preparing an impact-resistant, high melt flow polycarbonamide comprising the steps of:

(a) preparing an impact modifier concentrate comprising a mixture of (i) 70–90 parts by weight of an acrylic impact modifier and (ii) 10–30 parts by weight of at least one high molecular weight aliphatic polycarbonamide; and (b) mixing 10–30 parts by weight of the impact modifier concentrate from (a) above with 70–90 parts by weight of at least one low molecular weight aliphatic polycarbonamide.

In another aspect, this invention comprises an impact-modified, high melt flow polycarbonamide composition comprising a polycarbonamide blend prepared by the method of this invention wherein the final polycarbonamide blend is characterized by high impact resistance and a melt flow which is essentially the same as that of the blend of the impact modifier and the low molecular weight polycarbonamide alone.

In yet another aspect, this invention comprises an article of manufacture comprising the impact resistant, high melt flow polycarbonamide prepared according to the method of this invention.

In still another aspect, this invention comprises an impact modifier composition, useful for improving the impact resistance of a high melt flow polycarbonamide, comprising a mixture of an acrylic impact modifier and at least one high molecular weight polycarbonamide.

The low and high molecular weight polycarbonamides suitable for use in the invention comprise members selected from the group having repeating units represented by the formulae $-(CH_2)_m-CO-NH-(CH_2)_n-NH-CO-$ and $-(CH_2)_n-CO-NH-$, wherein m and n are independently selected integers having a value of from 4 to 8. Examples of suitable polycarbonamides are those prepared from the reaction of suitable diamines with suitable dicarboxylic acids or from amide-forming derivatives of these compounds and from polymerizable monoamino monocarboxylic acids or their acid-forming derivatives. The term "nylon" as used throughout this specification is synonymous with the term "polycarbonamide". Poly(hexamethyleneadipamide) and poly(caproamide) (i.e. "66" and "6" nylons) are typical. Most preferably, the low and high molecular weight polycarbonamides used in this invention comprise a member selected from the group having repeating units represented by the formula $-(CH_2)_m-CO-NH-(CH_2)_n-NH-CO-$ wherein m and n are independently integers having a value of from 4 to 8.

For purposes of setting forth the preferred parameters of this invention, high molecular weight polycarbonamide means a polycarbonamide characterized as having a melt flow, measured at 275° C. and 6.5 psi, of about 0.1–1.5 grams/10 minutes; and low molecular weight polycarbonamide means a polycarbonamide characterized as having a melt flow, measured at 275° C. and 6.5 psi, of about 3.5–5.0 grams/10 minutes. While the polycarbonamide molecular weight ranges set forth hereinabove are preferred, they are not to be taken to be exclusive of all other possible combinations of high and low, or even intermediate, molecular weight polycarbonamides.

The known acrylic core//shell impact modifiers mentioned hereinabove have been found to be compatible with higher molecular weight polycarbonamides but incompatible with lower molecular weight polycarbonamides. Blends of an acrylic modifier of U.S. Pat. No. 3,985,703 in commercial higher molecular weight nylon such as, for example, Zytel$^R$ 42 (DuPont) yield materials having improved impact strength but very poor flow. On the other hand, blends of an acrylic modifier of U.S. Pat. No. 3,985,703 in commercial lower molecular weight nylon such as, for example, Zytel$^R$ 101 (DuPont) yield materials having good flow but no improvement in impact strength. By making a concentrate of the acrylic modifier and a small amount of the higher molecular weight nylon, and then adding this concentrate to a large amount of lower molecular weight nylon, a material characterized by improved impact strength and good flow is obtained. Accordingly, it is conceived and demonstrated herein, that the optimal combination of improved impact strength and high melt flow is achieved as the molecular weight of the polycarbonamide used in the modifier concentrate increases and the molecular weight of the polycarbonamide used in the addition step is decreased.

The acrylic modifier used in this invention is an elastomer-based polymer wherein the elastomeric portion is polymerized from a monomer mixture containing at least 50 parts by weight of at least one ($C_1$ to $C_{15}$) alkyl acrylate, 0 to 5 parts by weight of at least one graftlinking monomer, 0 to 5 parts by weight of a crosslinking monomer, and the balance, to total 100 parts by weight of said monomer mixture of one or more other polymerizable ethylenically unsaturated monomers. Suitable graftlinking monomers include allyl, methallyl and crotyl esters of acrylic acid, methacrylic acid, maleic acid, fumaric acid, and itaconic acid; allyl, methallyl and crotyl vinyl ether and thioether; and the like. Preferred graftlinking monomers include allyl acrylate, allyl methacrylate, diallyl maleate, diallyl fumarate, diallyl itaconate, allyl acid maleate, allyl acid fumarate, and allyl acid itaconate. Suitable crosslinking monomers include polyethylenically unsaturated monomers such as, for example, polyacrylic and polymethacrylic esters of polyols, polyvinyl aromatic compounds, and the like. Preferred crosslinking monomers include butylene diacrylate and dimethacrylate, trimethylol propane trimethacrylate, and the like; and di- and trivinyl benzene.

More preferably, the acrylic impact modifier is an elastomer-based multistage acrylic core//shell polymer having a rigid thermoplastic final stage polymerized in the presence of, and graftlinked to, a crosslinked elastomeric first stage polymer. In a more preferred embodiment, the acrylic impact modifier comprises a multistage acrylic core//shell polymer having:

(a) 55 to 85 parts by weight of a first acrylic elastomeric stage comprising a polymer polymerized from a monomer mixture comprising at least 70 parts by weight of at least one ($C_4$ to $C_8$) alkyl acrylate, 0.1 to 5 parts by weight of at least one graftlinking monomer, 0 to 5 parts by weight of a crosslinking monomer, and the balance to total 100 parts by weight of said first-stage monomer mixture comprising one or more other polymerizable monoethylenically or conjugated diethylenically unsaturated monomers selected from the group of aromatic vinyl monomers, ($C_1$ to $C_4$) alkyl methacrylates, acrylonitrile, methacrylonitrile, vinyl halide, vinyl acetate, butadiene, and isoprene; and (b) 15 to 45 parts by weight of a hard shell final stage polymer polymerized in the presence of said first elastomeric stage from a monomer mixture comprising at least 60 parts by weight of at least one ($C_1$ to $C_4$) alkyl methacrylate, 0 to 5 parts by weight of a crosslinking monomer, and the balance to total 100 parts by weight of said second monomer mixture comprising one or more other polymerizable ethylenically unsaturated monomers selected from the group of aromatic vinyl monomers, ($C_1$ to $C_4$) alkyl methacrylates, acrylonitrile, methacrylonitrile, vinyl halide and vinyl acetate.

In another more preferred embodiment, the acrylic impact modifier comprises a multistage acrylic core//shell polymer having:

(a) a first elastomeric stage polymerized from a monomer mixture of 50 to 99.9 parts by weight of ($C_1$ to $C_{15}$) alkyl acrylate, butadiene or substituted butadiene, the amount of alkyl acrylate being at least 50 parts by weight; 0 to 40 parts by weight of other ethylenically unsaturated monomers selected from the group of aralkyl acrylates, substituted acrylates and methacrylates including alkyl thio alkyl, alkoxyalkyl, hydroxy alkyl, haloalkyl, cyanoalkyl, and nitroalkyl acrylates and methacrylates, acrylamides and methacrylamides, styrene and alkylstyrenes, vinyl and vinylidene halides, and vinyl ethers, amides and esters; 0 to 5 parts by weight of a graftlinking monomer; and (b) a final stage polymerized in the presence of said first stage from a monomer mixture of 0.1 to 50 parts by weight of a copolymerizable carboxylic acid; 50 to 99.9 parts by weight of a member selected from the group consisting of alkyl methacrylate, styrenes, acrylonitrile, methacrylonitrile, and olefins that, when homopolymerized, form polymers having a heat distortion temperature greater than about 20° C; 0 to 49 parts by weight of another acrylic monomer; and 0 to 40 parts by weight of another copolymerizable ethylenically unsaturated monomer.

In a most preferred embodiment, the acrylic impact modifier comprises a multistage acrylic core//shell polymer having:

(a) 70–80 parts by weight of a first acrylic elastomeric stage comprising a polymer polymerized from a monomer mixture comprising about 79 to 99.5 parts n-butyl acrylate, 0–10 parts of one or more polymerizable monoethylenically or conjugated diethylenically unsaturated monomer, 0.1 to 5 parts 1,4-butylene glycol diacrylate and 0.1 to 5 parts diallyl maleate; and (b) 20–30 parts by weight hard shell final stage polymer polymerized in the presence of said first elastomeric stage from a monomer mixture comprising about 80–100 parts by weight methyl methacrylate, 0–20 parts by weight other monoethylenically unsaturated monomer and 0–5 parts by weight monoethylenically unsaturated carboxylic acid.

The impact modifier concentrate of this invention suitable for use with low molecular weight polycarbonamides comprises a melt-mixed blend of:

(a) 70–90 parts by weight of an acrylic impact modifier; and (b) 10–30 parts by weight of at least one high molecular weight polycarbonamide.

Preferably, the high molecular weight polycarbonamide is characterized by possessing a melt flow, measured at 275° C. and 6.5 psi, of about 0.1–1.5 grams/10 minutes and selected from the group having repeating units represented by the formulae $-(CH_2)_m-CO-NH-(CH_2)_n-NH-CO-$ and $-(CH_2)_n-CO-NH-$ wherein m and n are, independently, integers having a value of from 4–8.

The high impact-resistant, high melt flow, low molecular weight polycarbonamides of the invention may optionally further comprise up to 50 parts by weight mineral filler, up to 5 parts by weight coupling agent and up to 50 parts by weight fibrous reinforcement. The use of these optional components is well known in the art and those skilled in the art would recognize and know how to select and use them.

The blend of the acrylic impact modifier with the high molecular weight aliphatic polycarbonamide to form the impact modifier concentrate and of the acrylic impact modifier concentrate with the low molecular weight aliphatic polycarbonamide can be accomplished by any known melt blending method. The impact modifier concentrate can be prepared by mixing the relatively dry coagulated or spray dried core//shell polymer with nylon chip pellets or fiber block and the resulting blend can be processed to form a well dispersed mixture in an extruder, a roll mill, a Banbury mixer or like equipment whereupon the blend can be extruded into strands and subsequently converted into pellets or chips of suitable size for further processing. The blend of the modifier concentrate with low molecular weight aliphatic polycarbonamide can be prepared by techniques similar to those described hereinabove for the preparation of the concentrate of the invention.

The preferred method of practicing the invention is to prepare a melt-mixed modifier concentrate by extruding the modifier with high molecular weight polycarbonamide pellets. The resulting strands are converted into pellets, dried, mixed with low molecular weight polycarbonamide pellets and any optional components such as, for example, stabilizers, pigments, and fillers, and then extruded to give strands of impact-modified, low molecular weight polycarbonamides which are converted into pellets and subsequently dried. The dried product pellets can then be used to make a variety of useful articles by such techniques as, for example, extrusion and injecting molding.

Examples of articles which can be prepared using the methods and compositions of the invention include gears, bushings, bearings, housing for electrical tools, automotive parts, electronic cases and the like. The product is most useful in end-uses where high melt flow is required for intricate part designs and where unmodified nylon shows notch sensitivity to cracking and breaking.

The following examples are presented to illustrate but a few embodiments of the invention and are not intended to be limiting in scope. All parts and percentages are by weight unless otherwise indicated.

DESCRIPTION OF THE PREFERRED EMBODIMENTS

EXAMPLE 1

Following the teachings of Example I, C of U.S. Pat. No. 3,985,703, a multistage core//shell acrylic impact modifier is prepared by a method wherein about 20 parts by weight of methyl methacrylate are polymerized in the presence of a first polymer polymerized from a monomer mixture of about 79 parts by weight butyl acrylate, about 0.5 parts by weight butylene glycol diacrylate and about 0.5 parts by weight diallyl maleate.

To a one-inch Killion extruder, equipped with a two-stage high-compression screw and a right angle adapter die block for a two-channel strand extrusion, is added a dried tumble blended mixture of about 80 parts of the modifier described hereinabove and about 20 parts by commercial high molecular weight poly(hexamethyleneadipamide) pellets (intrinsic viscosity in $H_2SO_4$ 2.19 dl/g; melt flow 0.67 g/10 min) (Zytel 42, E. I. DuPont). The extruder zones are set as follows:

| Zone | Screw at 68 rpm | | | Right Angle | Die |
|---|---|---|---|---|---|
| | #1 | #2 | #3 | | |
| Temp., °F. | 500–505 | 510–520 | 530–535 | 520 | 530 |
| °C. | 260–263 | 265–271 | 277–279 | 271 | 277 |

The strands are converted into pellets which are then dried at 60°–80° C. overnight under vacuum to obtain an acrylic impact modifier concentrate.

24 parts of the above-described modifier concentrate are tumble blended with 76 parts of low molecular weight poly(hexamethyleneadipamide) (intrinsic viscosity in $H_2SO_4$ 1.38 dl/g; melt flow rate 4.1 g/10 min) (Zytel 101, E. I. DuPont) and the resulting blend is again extruded as described above in order to obtain a more uniform blend of the modifier and the low molecular weight poly(hexamethyleneadipamide). This blend is injection molded using a Newbury 1-ounce molder at the following conditions:

| Throat | Barrel | Nozzle | Nozzle Type | Screw | Mold Temp. |
|---|---|---|---|---|---|
| 500° F. | 510° F. | 520° F. | Nylon | Maximum Work | 150° F. |
| 260° C. | 265° C. | 271° C. | | | 65° C. |

Physical properties of the resulting product are presented in TABLE I. Similar results are obtained when the tumble-blended mixture, as described above, is injection molded in the absence of additional processing.

EXAMPLE 2

Example 1 above is repeated except that another different commercial low molecular weight poly(hexamethyleneadipamide) (Vydyne 21, Monsanto) having essentially the same intrinsic viscosity and melt flow rate as the low molecular weight poly(hexamethyleneadipamide in Example 1 is used. The physical properties of the resulting product are shown in TABLE I.

EXAMPLE 3

Fifteen parts of the acrylic impact modifier of Example 1 are tumble blended with 45 parts of the commercial low molecular weight poly(hexamethyleneadipamide) of Example 1 (Zytel 101, E. I. Dupont) and the resulting blend is co-extruded using the Killion extruder described in Example 1 set at the following conditions.

| Zone | Screw at 68 rpm | | | | Die |
|---|---|---|---|---|---|
| | Feed | #2 | #3 | #4 | |
| Temp (°F.) | 480 | 510 | 520 | 530 | 520 |

The resulting impact-modified polycarbonamide extrudate is pelletized, the pellets are charged to a Prodex-Henschel blender and, while operating the blender at low speed, one part of organosilane coupling agent is charged to the blender. The mixture is blended at normal speed for about six minutes. Then 40 parts of calcium metasilicate are added and the mixture is blended for an additional two minutes. The filled impact-modified, low molecular weight polycarbonamide blend is repelletized using the Killion extruder described hereinabove in Example 1 at the following conditions:

| Zone | Screw - MV at 68 rpm | | | | |
|---|---|---|---|---|---|
| | Feed | #2 | #3 | #4 | Die |
| Temp (°F.) | 480 | 510 | 520 | 530 | 520 |

After being dried at 70°–90° C. under vacuum, the extruded pellets are injection molded using a Newbury 1-ounce molder to obtain ½ by ¼ inch bars for notched Izod impact tests and 2 by 3 by ⅛ inch plaques for Gardner impact tests under the following molding conditions:

| Barrel Temp. | (rear) | 500° F. |
|---|---|---|
| | (front) | 510° F. |
| Nozzle | | 520° F. |
| Mold | | 150° F. |
| Injection Pressure | | 600 psi |

The physical properties of the filled impact-modified, high melt flow, low molecular weight polycarbonamide articles are presented in TABLE III.

The following tables present comparative data which illustrate the advantages and usefulness of the invention.

TABLE I

Comparison of Physical Properties of Modified and Non-Modified Low Molecular Weight[a] Nylons

| Polymer | Izod Impact ¼" notched ft.-lbs. avg. (range) | DTUFL ASTM #D648 °F. | Rockwell ASTM #D785 (at 264 psi) M | Tensile ASTM #D638 | | Modulus ASTM #D638 psi |
|---|---|---|---|---|---|---|
| | | | | Yield Stress psi | Elongation at Break % | |
| Example 1 | 1.8(1.7–1.8) | 162/144 | 57/56 | 7,300 | 82 | 270,000 |
| Zytel 101[b] | 0.8(0.5–1.0) | 183/205 | 83/83 | 9,100 | 210 | 330,000 |
| Example 2 | 1.7(1.5–2.0) | 187/167 | 57/58 | 7,400 | 98 | 280,000 |
| Vydyne 21[c] | 1.0(0.9–1.2) | 193/201 | 82/80 | 10,000 | 156 | 360,000 |

[a]The samples are conditioned 72 hours at 23° C. and 50% relative humidity.
[b]E. I. DuPont, low molecular weight injection molding grade nylon 66.
[c]Monsanto, low molecular weight nylon 66.

The data presented in TABLE I above clearly demonstrate that articles prepared from the modified polycarbonamides of the invention possess improved impact strength when compared with non-modified commercial polycarbonamides.

TABLE II

Relative Flow Properties of Impact Modified, High Melt Flow Polycarbonamide and a commercial High Molecular Weight Polycarbonamide; Spiral Flow Injection Molding-Auto-Molder

| Material | Flow in Inches | Izod Impact[a] Notched ft-lbs. |
|---|---|---|
| Zytel 42[b] | 20 | 0.94 |
| Example 1 | 32.5 | 2.0 |
| Conditions: | Zones | Rear | Center | Front | Nozzle | Mold |
| | Temp., °F. | 540 | 540 | 570 | 520 | 150 |
| | Injection Pressure: 800 psi | | | | | |

[a]Samples cut from the end of the spiral flow samples.
[b]E. I. DuPont, high molecular weight nylon 66 (intrinsic viscosity in $H_2SO_4$ 2.19 dl/g; melt flow 0.67 g/10 min).

The spiral flow data presented in TABLE II, obtained as an indicator of the moldability of the modified polycarbonamide of the invention, show that an article prepared from a modified polycarbonamide of the invention is not characterized by a substantial decrease in flow as a result of the incorporation of the modifier concentrate compared with the commercial high molecular weight non-modified polycarbonamide.

TABLE III

Comparison of Properties of Mineral Filled Nylon 66[a]

| Polymer | Izod Impact | Gardner Impact in. lbs | in. lbs/ in. | DTUFL °F. | Rockwell M | Yield Stress psi | Elong. at Brk. % | Modulus psi |
|---|---|---|---|---|---|---|---|---|
| Example 3[b] | 0.87 (.75–.92) | 29 ±5.2 | 207 ±37 | 160 | 62 | 6,560 | 12 | 388,000 |
| Commercial Mineral Filled Nylon 66[c] | 0.46 (.43–.51) | 6 ±0 | 43 ±0 | 200 (196–200) | 90 | 10,310 | 3 | 761,000 |
| Non-Modified Mineral Filled Nylon 66[d] | .57 (.48–.68) | 10 ±7.6 | 74 ±54 | | | | | |

[a]The samples are conditioned 72 hours at 23° C. and 50% relative humidity.
[b]Modified mineral filled nylon 66 of the invention.
[c]E. I. DuPont product, Minlon 10B-140, is used to prepare articles as in Example 3.
[d]E. I. DuPont low molecular weight nylon 66, Zytel 101, and Interpace Corp. calcium metasilicate mineral filler, Wollastonite, are blended and the blend is used to prepare articles as in Example 3.

The data presented in TABLE III illustrate that the modified polycarbonamide (nylon) of the invention possesses substantially improved impact strength but at the expense of tensile strength and modulus. This feature does not diminish the advantages and usefulness of the modified polycarbonamides (nylons) of the invention because the modified polycarbonamides are nonetheless favorably suitable for many applications. Since modulus is generally known to be inversely related to rubber level, it is readily apparent that, when required, a more favorable balance of impact strength and modulus may be achieved by suitable reduction of the level of acrylic core//shell modifier in the modifier concentrate and/or of levels of modifier concentrate.

The tests used in the examples above to evaluate the polycarbonamide samples are well known standard methods identified as follows:

Izod Impact Test: ASTM #D-256
DTUFL Test: ASTM #D-648
Rockwell Test: ASTM #D-785
Tensile Stress & Modulus Test: ASTM #D-638
Gardner Impact Test (VHIT Impact): Tester supplied in commerce by Gardner Laboratories, Bethesda, MD.

I claim:

1. A method for preparing impact-resistant, high melt flow polycarbonamides comprising the steps of:
    (a) preparing an impact modifier concentrate comprising a mixture of (i) 70–90 parts by weight of an acrylic impact modifier and (ii) 10–30 parts by weight of at least one high molecular weight aliphatic polycarbonamide having a melt flow, measured at 275° C. and 6.5 psi, of about 0.1–1.5 grams/10 minutes; and
    (b) mixing 10–30 parts by weight of the impact modifier concentrate from (a) above with 70–90 parts by weight of at least one low molecular weight aliphatic polycarbonamide having a melt flow, measured at 275° C. and 6.5 psi, of about 3.5–5.0 grams/10 minutes.

2. The method of claim 1 wherein said low and high molecular weight polycarbonamides comprise members selected from the group having repeating units represented by the formulae (a) $-(CH_2)_m-CO-NH(CH_2)_nNH-CO-$ and (b) $-(CH_2)_n-CO-NH-$, wherein m and n are, independently, integers having a value of from 4 to 8.

3. The method of claim 2 wherein said low and high molecular weight polycarbonamides comprise a member selected from the group having repeating units represented by the formula $-(CH_2)_m-CO-NH-(CH_2)_n-NH-CO-$ wherein m and n are, independently, integers having a value of from 4 to 8.

4. The method of claim 2 wherein said acrylic impact modifier comprises an elastomer-based polymer wherein the elastomeric portion is polymerized from a monomer mixture containing at least 50 parts by weight of at least one ($C_1$ to $C_{15}$) alkyl acrylate, 0 to 5 parts by weight of at least one graftlinking monomer, 0 to 5 parts by weight of a crosslinking monomer, and the balance, to total 100 parts by weight of said monomer mixture, of one or more other polymerizable ethylenically unsaturated monomers.

5. The method of claim 2 wherein said acrylic impact modifier comprises a multistage acrylic core//shell polymer having:
    (a) 55 to 85 parts by weight of a first acrylic elastomeric stage comprising a polymer polymerized from a monomer mixture comprising at least 70 parts by weight of at least one ($C_4$ to $C_8$) alkyl acrylate, 0.1 to 5 parts by weight of at least one graftlinking monomer, 0 to 5 parts by weight of a crosslinking monomer, and the balance to total 100 parts by weight of said first-stage monomer mixture comprising one or more other polymerizable monoethylenically or conjugated diethylenically unsaturated monomers selected from the group of aromatic vinyl monomers, ($C_1$ to $C_4$) alkyl methacrylates, acrylonitrile, methacrylonitrile, vinyl halide, vinyl acetate, butadiene, and isoprene; and
    (b) 15 to 45 parts by weight of a hard shell final stage polymer polymerized in the presence of said first elastomeric stage from a monomer mixture comprising at least 60 parts by weight of at least one ($C_1$ to $C_4$) alkyl methacrylate, 0 to 5 parts by weight of a crosslinking monomer, and the balance to total 100 parts by weight of said second monomer mixture comprising one or more other polymerizable ethylenically unsaturated monomers selected from the group of aromatic vinyl monomers, ($C_1$ to $C_4$) alkyl methacrylates, acrylonitrile, methacrylonitrile, vinyl halide and vinyl acetate.

6. The method of claim 3 wherein said acrylic impact modifier comprises a multistage acrylic core//shell polymer having:
    (a) a first elastomeric stage polymerized from a monomer mixture of 50 to 99.9 parts by weight of ($C_1$ to $C_{15}$) alkyl acrylate, butadiene or substituted butadiene, the amount of alkyl acrylate being at least 50 parts by weight; 0 to 40 parts by weight of other ethylenically unsaturated monomers; 0 to 5 parts by weight of a graftlinking monomer; and
    (b) a final stage polymerized in the presence of said first stage from a monomer mixture of 0.1 to 50 parts by weight of a copolymerizable carboxylic acid; 50 to 99.9 parts by weight of a member selected from the group consisting of alkyl methacrylate, styrenes, acrylonitrile, methacrylonitrile, and olefins that, when homopolymerized, form polymers having a heat distortion temperature greater than about 20° C.; 0 to 49 parts by weight of another acrylic monomer; and 0 to 40 parts by weight of another copolymerizable ethylenically unsaturated monomer.

7. The method of claim 5 wherein said acrylic impact modifier comprises a multistage acrylic core/shell polymer having:
    (a) 70 to 80 parts by weight of a first acrylic elastomeric stage comprising a polymer polymerized from a monomer mixture comprising 79 to 99.5 parts n-butyl acrylate, 0 to 10 parts of one or more polymerizable monoethylenically or conjugated diethylenically unsaturated monomer, 0.1 to 5 parts 1,4-butylene glycol diacrylate and 0.1 to 5 parts diallyl maleate; and
    (b) 20 to 30 parts by weight hard shell final stage polymer polymerized in the presence of said first elastomeric stage from a monomer mixture comprising about 80 to 100 parts by weight methyl methacrylate, 0 to 20 part other monoethylenically unsaturated monomer and 0 to 5 parts monoethylenically unsaturated carboxylic acid.

8. The method of claim 1 wherein said high impact-resistant, high melt flow polycarbonamides further comprise up to 50 parts by weight mineral filler and up to 5 parts by weight coupling agent.

9. The method of claim 8 wherein said high impact-resistant, high melt flow polycarbonamides further comprise up to 50 parts by weight fibrous reinforcement.

10. The method of claim 1 comprising the steps of:
(a) preparing an impact modifier concentrate comprising a melt-mixed blend of a multistage core//shell polymer having a first acrylic elastomeric stage comprising a polymer polymerized from a monomer mixture of about 80 parts by weight n-butyl acrylate, about 0.5 parts by weight 1,4-butylene glycol diacrylate, and about 0.5 parts by weight diallyl maleate; and a hard shell final stage polymer polymerized in the presence of said first elastomeric stage polymer from a monomer mixture of about 20 parts by weight methyl methacrylate; and (ii) poly(hexamethyleneadipamide) having a melt flow, measured at 275° C. and 6.5 psi, of about 0.1–1.5 grams/10 minutes, wherein the ratio of core//shell polymer to poly(hexamethyleneadipamide) is about 1.4; and
(b) mixing about 10–20 parts by weight of the impact modifier concentrate from (a) above with (i) about 40 to 50 parts by weight poly(hexamethyleneadipamide) having a melt flow, measured at 275° C. and 6.5 psi, of about 3.5–5.0 grams/10 minutes; (ii) about 30 to 40 parts by weight calcium metasilicate filler; and (iii) about 0.5 to 2 parts by weight organosilane coupling agent.

11. A composition produced according to the method of claim 1.

12. An article of manufacture extruded or molded from the composition of claim 1.

13. A process for producing an article of manufacture comprising injection molding a composition produced by the method of claim 10.

* * * * *